(12) United States Patent
McLaughlin (10) Patent No.: US 8,204,078 B2
(45) Date of Patent: Jun. 19, 2012

(54) APPARATUS, SYSTEM, AND METHOD FOR INTEGRATION OF WIRELESS DEVICES WITH A DISTRIBUTED CONTROL SYSTEM

(75) Inventor: Paul F. McLaughlin, Ambler, PA (US)

(73) Assignee: Honeywell International Inc., Morristown, NJ (US)

( * ) Notice: Subject to any disclaimer, the term of this patent is extended or adjusted under 35 U.S.C. 154(b) by 857 days.

(21) Appl. No.: 11/394,947

(22) Filed: Mar. 31, 2006

(65) Prior Publication Data

US 2007/0237137 A1 Oct. 11, 2007

(51) Int. Cl.
*H04J 3/16* (2006.01)
*H04J 3/22* (2006.01)
*G01R 31/08* (2006.01)
*G06F 11/00* (2006.01)
*G08C 15/00* (2006.01)
*H04J 1/16* (2006.01)
*H04L 1/00* (2006.01)
*H04L 12/26* (2006.01)
*H04L 12/28* (2006.01)

(52) U.S. Cl. ...................................................... 370/466
(58) Field of Classification Search .................... 370/467
See application file for complete search history.

(56) References Cited

U.S. PATENT DOCUMENTS

| 5,793,963 | A | 8/1998 | Tapperson et al. |
| 6,032,203 | A | 2/2000 | Heidhues |
| 6,522,664 | B1 | 2/2003 | Kawahara |
| 6,587,900 | B1 | 7/2003 | Wischinski |
| 7,233,745 | B2 * | 6/2007 | Loechner ...................... 398/128 |
| 2002/0077711 | A1 | 6/2002 | Nixon et al. |
| 2002/0090001 | A1* | 7/2002 | Beckwith ...................... 370/466 |
| 2002/0099465 | A1 | 7/2002 | Su |
| 2004/0259533 | A1* | 12/2004 | Nixon et al. ................ 455/414.1 |
| 2005/0164684 | A1* | 7/2005 | Chen et al. .................. 455/414.1 |

(Continued)

FOREIGN PATENT DOCUMENTS

DE 1000609 A1 7/2001

(Continued)

OTHER PUBLICATIONS

Suk Lee; Kyung Chang Lee; Man Hyung Lee; Harashima, F., "Integration of mobile vehicles for automated material handling using Profibus and IEEE 802.11 networks," Industrial Electronics, IEEE Transactions on , vol. 49, No. 3, pp. 693-701, Jun. 2002.*

(Continued)

*Primary Examiner* — Derrick Ferris
*Assistant Examiner* — Christopher Crutchfield (57) ABSTRACT

A wireless marshalling panel includes a field device protocol communication link. The wireless marshalling panel is capable of receiving a message from a wireless device and transmitting a corresponding message to a process controller via the communication link. The panel is also capable of receiving a message from the process controller via the communication link and transmitting a corresponding message to the wireless device. The messages transmitted and received via the communication link may be an analog current signal or a frequency shift keying signal. The wireless marshalling panel may include a second field device protocol communication link and also be capable of receiving a message via the second communication link and transmitting a corresponding message to a second wireless device. The wireless marshalling panel may also be capable of receiving a message from the second wireless device and transmitting a corresponding message via the second communication link.

23 Claims, 3 Drawing Sheets

U.S. PATENT DOCUMENTS

| | | | |
|---|---|---|---|
| 2005/0276233 A1* | 12/2005 | Shepard et al. | 370/254 |
| 2006/0075009 A1 | 4/2006 | Lenz et al. | |
| 2007/0233283 A1 | 10/2007 | Chen | |
| 2009/0097415 A1* | 4/2009 | Shepard et al. | 370/254 |

FOREIGN PATENT DOCUMENTS

| | | |
|---|---|---|
| WO | WO 02/05199 A1 | 1/2002 |
| WO | WO 2004/042674 A1 | 5/2004 |
| WO | WO 2005/086110 A2 | 9/2005 |
| WO | WO 2006/007521 A1 | 1/2006 |

OTHER PUBLICATIONS

Willig, A.; Matheus, K.; Wolisz, A., "Wireless Technology in Industrial Networks," Proceedings of the IEEE, vol. 93, No. 6, pp. 1130-1151, Jun. 2005.*

Cavalieri, S.; Panno, D., "On the integration of FieldBus traffic within IEEE 802.11 wireless LAN," Factory Communication Systems, 1997. Proceedings. 1997 IEEE International Workshop on, vol., no., pp. 131-138, Oct. 1-3, 1997.*

John Tandy (Tandy I), Wireless HART Communication Creates Extended Meter Reading Network, Arcom Control Systems, Apr. 2001, pp. 1-3.*

John Tandy (Tandy II), HART over Ethernet Networks, ARCOM Controls, Aug. 2002, pp. 1-7.*

Author Unknown, The 905U-G Wireless Gateway User Manual (The ELPRO User Manual), ELPRO Technologies, Ltd, Aug. 10, 2003, pp. 1-89.*

Author Unknown, Process Automation: HART Interface Solutions (The ELCON Hart Interface Solutions Guide), Pepperl+Fuchs and ELCON, May 17, 2003, pp. 1-20.*

Kevin Zamzow, Prosoft Technologies, Radiolinx Presentation, Apr. 4, 2005, pp. 1-110.*

* cited by examiner

APPARATUS, SYSTEM, AND METHOD FOR INTEGRATION OF WIRELESS DEVICES WITH A DISTRIBUTED CONTROL SYSTEM

TECHNICAL FIELD

This disclosure relates generally to distributed control systems and more specifically to an apparatus, system, and method for integration of wireless sensing and control devices with a distributed control system.

BACKGROUND

A process plant is typically a complex, multifaceted entity, such as a structured organization of physical elements operated for economic and other criteria that are often industry-specific. A process plant often has a number of different stakeholders who can affect its operation and/or who are affected by its operation. Critical to the operation of many process plants today is a process control system, which ensures that appropriate parameters are measured and actions taken, plant personnel are kept informed, abnormal situations are identified and addressed, and business processes are integrated. Automation and control systems are employed in diverse applications, such as refining and petrochemical plants, petroleum and natural gas supply chains, pulp and paper manufacturing, electrical power generation, chemical production, food production, wastewater treatment, discrete product manufacturing, cable-laying ships, tunnel ventilation control, and mining operations.

A process control system typically includes a process controller in communication with field devices such as process sensors, process actuators, and user interfaces. The process controller may receive measured values of process variables from the process sensors and may control positions of process actuators to maintain the process variables within desired ranges. Various communication techniques between a process controller and its nodes have been developed. As new communication mechanisms are developed, process controllers may be upgraded to support these new communication mechanisms.

However, field devices utilizing new communication mechanisms are often not added to existing process control systems because of the cost of upgrading a process controller to support the new communication mechanisms. Furthermore, upgrading a process controller may require shutting down operation of an entire process plant while upgrades are made.

SUMMARY

This disclosure provides an apparatus, system, and method for integration of wireless devices with a distributed control system without requiring modifications to the hardware or software of that DCS.

In a first embodiment, an apparatus includes a network interface capable of receiving a first message from a first wireless device. The apparatus also includes a controller capable of generating a second message from the first message. In addition, the apparatus includes a field device protocol interface capable of transmitting the second message.

In particular embodiments, the second message is transmitted as an analog current signal or as a frequency shift keying signal. In other particular embodiments, the apparatus includes a second field device protocol interface, which is capable of receiving a third message. The controller is further capable of generating a fourth message from the third message, and the network interface is further capable of transmitting the fourth message to a second wireless device. In yet other particular embodiments, the third message is received as an analog current signal or as a frequency shift keying signal.

In a second embodiment, a system includes a first wireless device, a process controller, and a wireless marshalling panel that includes a first field device protocol communication link. The wireless marshalling panel is capable of receiving a first message from the first wireless device and transmitting a corresponding second message to the process controller via the first field device protocol communication link.

In a third embodiment, a method includes receiving a first message from a wireless device. The method also includes transmitting a corresponding second message to a process controller via a first field device protocol communication link.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
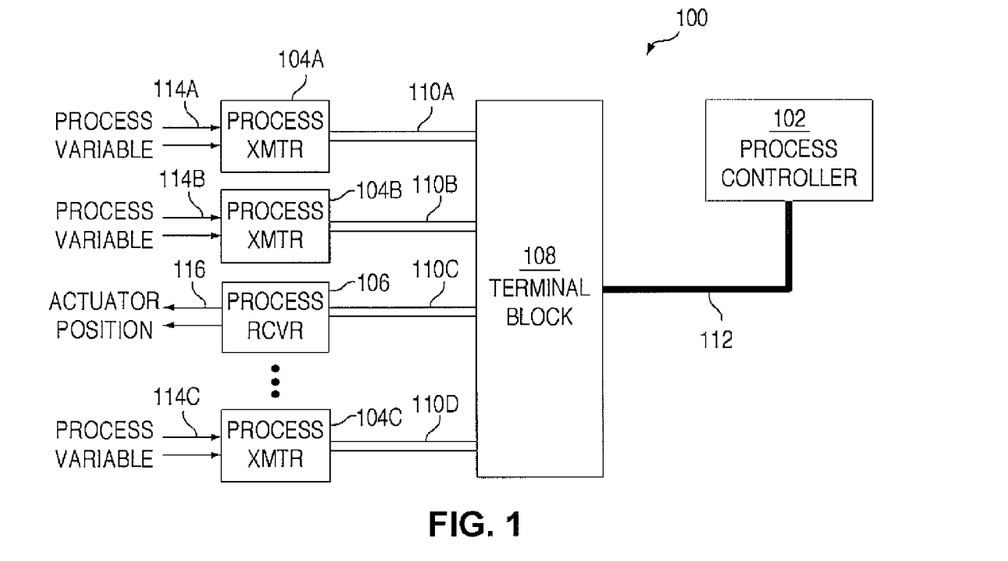
FIG. 1 illustrates an example system for distributed process control.

FIG. 1 illustrates an example system 100 for process control. A process controller 102 may communicate with field devices such as process transmitters 104A-104C and a process receiver 106. The process transmitter 104A may measure an analog voltage on an input 114A that is proportional to a process variable, such as a pressure sensed by a pressure transducer. The measured process variable value may be referred to as a primary process variable. The process transmitter 104A may produce a signal on a wire pair 110A proportional to the voltage on the input 114A. The wire pair 110A may be electrically connected to a first terminal in a terminal block 108. Also connected to the terminal block 108 may be a multi-conductor cable 112 that carries the signals, each on its own wire pair within the cable 112, from a plurality of terminals in the terminal block 108 to the process controller 102.

Similarly, the process transmitter 104B may be electrically coupled to a flow transducer and measure an analog current generated by the flow transducer. The process transmitter 104B may generate a signal on a wire pair 110B that is electrically connected to a second terminal in the terminal block 108. The process transmitter 104C may generate a signal proportional to a process variable 114C on a wire pair 110D electrically connected to a third terminal in the terminal block 108.

In contrast, the process receiver 106 may receive a signal from the process controller 102 on a wire pair 110C. The signal on the wire pair 110C may be proportional to, for example, a desired position of a valve or other actuator position 116. Thus, a process controller may communicate with field devices such as process transmitters and receivers via individual dedicated links between the process controller and each node.

Each of the signals on the wire pairs 110A-110D may be, for example, an analog current in the range of 4-20 milliamps. Secondary information may be communicated between the process controller 102 and the process transmitters 104A-104C and the process receiver 106 by a field device protocol such as the Highway Addressable Remote Transducer (HART) protocol. In a HART protocol communication link, a second signal (such as a low voltage, low current, high frequency signal) is superimposed over the analog current signal. The second signal is a binary frequency shift keying (FSK) signal in which a 1,200 Hz signal represents a binary one and a 2,200 Hz signal represents a binary zero.

In the HART protocol, either end of a communication link may transmit secondary information to the other end. For example, the process transmitter 104A may transmit values of a secondary process variable, such as pump body temperature, to the process controller 102. The process controller 102 may transmit calibration commands to the process transmitter 104B. The process controller 102 may transmit a request for maintenance information to the process receiver 106 and receive an indication of a number of hours of operation since the last maintenance of the actuator from the process receiver 106.

Figure 2:
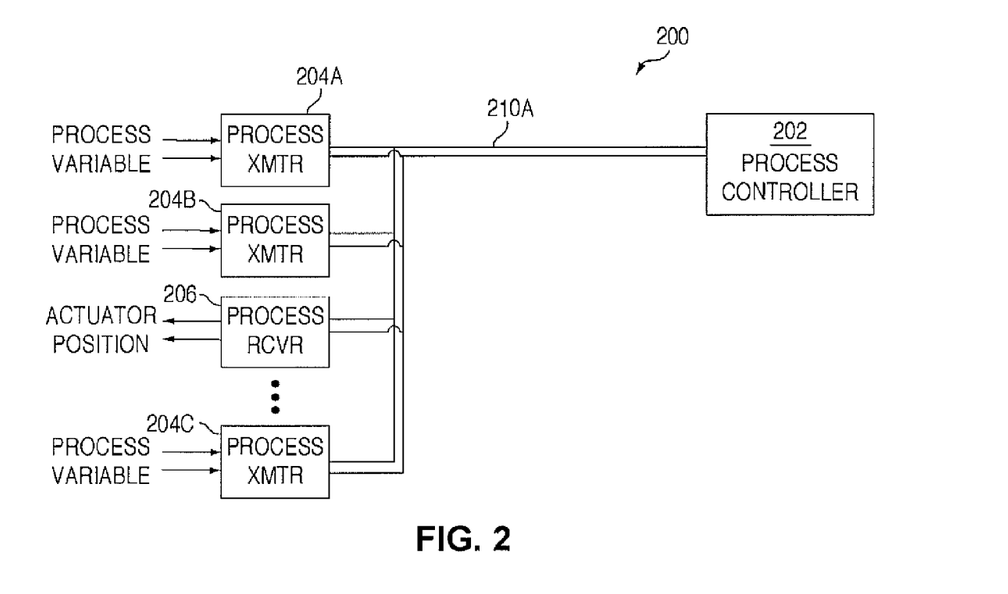
FIG. 2 illustrates another example system for distributed process control.

FIG. 2 illustrates another example system for distributed process control. In this system, a process controller 202 is capable of communicating with a plurality of field devices 204A-204C and 206 on a single wire pair 210A.

The process controller 202 may use a field device protocol such as the Foundation Fieldbus (FF) H1 standard to communicate with multiple field devices on a single wire pair. The FF H1 standard defines a communication link that supplies power from a process controller to any field devices connected to the wire pair, as well as providing bi-directional digital signaling. Other digital signaling field device protocols include FF High Speed Ethernet, Modbus, Profibus, and WorldFIP.

For purposes of describing example embodiments of this disclosure (with reference to FIGS. 3A, 5A and 5B), a HART protocol communication link will be used for illustrative purposes. For FIG. 3B, a FF H1 communication link will be used for illustrative purposes. It will be understood, however, that communication links utilizing other field device protocols may be employed without departing from the scope of this disclosure.

Figure 3A:
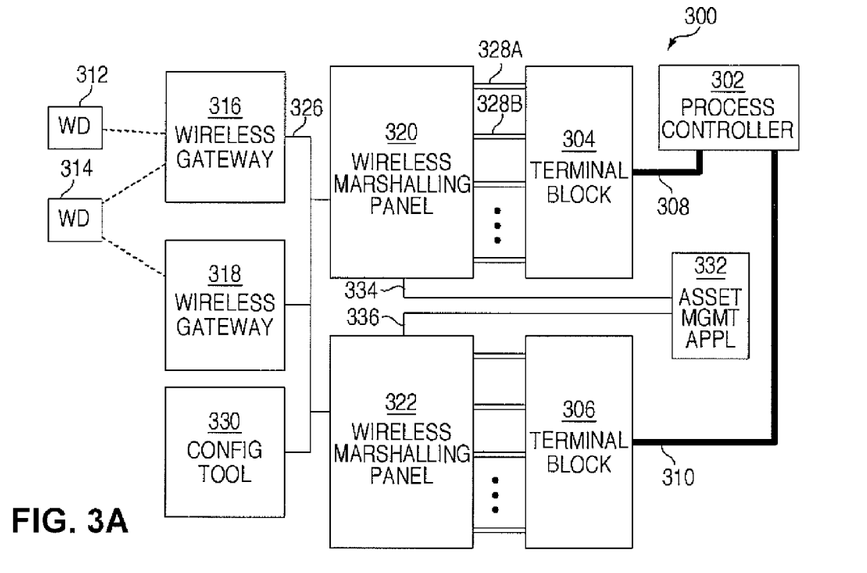
FIG. 3A illustrates an example system for distributed process control according to one embodiment of this disclosure.

FIG. 3A illustrates an example system 300 for distributed process control according to one embodiment of this disclosure. The process control system 300 has a process controller 302, which is adapted for communication with field devices using a particular field device protocol. Wireless marshalling panels (WMPs) 320 and 322 may be used to enable the process controller 302 to communicate with, for example, wireless field devices 312 and 314.

The process controller 302 may be coupled to terminal blocks 304 and 306 by multi-conductor cables 308 and 310, respectively. The wireless field devices 312 and 314 may be, for example, a wireless process transmitter and wireless process receiver, respectively. The wireless field device 312 may communicate wirelessly with a wireless gateway 316, and the wireless field device 314 may communicate wirelessly with both the wireless gateway 316 and a wireless gateway 318. Both the wireless gateways 316 and 318 may be coupled to a network 326, such as a TCP/IP or Ethernet network. The WMPs 320 and 322 may also be coupled to the network 326.

In the system 300, primary process variable information transmitted by the wireless field device 312 and received by the WMP 320 may be converted into an analog current signal on a HART protocol communication link 328A electrically coupled to the process controller 302 via the terminal block 304. Similarly, the WMP 320 may receive an analog current signal from the process controller 302 on a HART communication link 328B via the terminal block 304 and transmit a corresponding message to the wireless field device 314 via either the wireless gateway 316 or the wireless gateway 318.

The wireless field device 312 may also transmit secondary or tertiary process variables to the WMP 320 via the wireless gateway 316. The WMP 320 may, in response, generate a corresponding message and transmit the message to the process controller 302 as a FSK signal. Likewise, the process controller 302 may transmit a FSK signal to the wireless field device 314 that is received by the WMP 320. The WMP 320 may then generate a corresponding message and transmit that message to the wireless field device 314 via either of the wireless gateways 316-318.

The process controller 302 will be configured to communicate with a process transmitter on the terminals of the terminal block 304 to which the wire pair 328A connects. Similarly, the process controller 302 will be configured to communicate with a process receiver on the terminal connected to wire pair 328B. Where the process controller 302 uses the HART field device communication protocol on links 328A and 328B, the process controller 302 will be further configured regarding the FSK signals used to communicate information other than primary process variables to the process transmitter and receiver on the links 328A and 328B. Many HART device manufacturers provide such configuration information in HART device descriptors.

A configuration tool 330 may also be coupled to the network 326. The configuration tool 330 may provide configuration information to the wireless devices 312 and 314, the wireless gateways 316 and 318 and the WMPs 320 and 322. This configuration information may be derived from HART device descriptors used to configure the process controller 302. The WMP configuration information will be used by the WMPs 320 and 322 to guide the generation of field device protocol messages sent to the process controller 302 that correspond to messages received from the wireless devices 312 and 314. Similarly, the WMP configuration information will be used by the WMPs 320 and 322 to guide the generation of messages transmitted to the wireless devices 312 and 314 that correspond to field device protocol messages received from the process controller 302.

In this way, the wireless field devices 312 and 314 may communicate with the process controller 302 without changes to the process controller 302 being required. An operator of a process control system may thus integrate wireless field devices into a non-wireless system without the cost or disruption of performing upgrades to the process controller 302.

Where the process controller 302 is capable of sending and receiving only primary process variable signals, for example analog current signals, the WMPs 320 and 322 may be configured by the configuration tool 330 only to send and receive such signals to the process controller 302. However, in such a circumstance the system 300 may include an asset management application 332, executing on a PC or other suitable processing platform, for communicating non-primary process variable information with field devices. The asset management application may be coupled to the WMPs 320 and 322 via communication links 334 and 336, respectively. The communication links 334 and 336 may utilize the RS-485 protocol, for example. In such a circumstance, the WMPs 320 and 322 may be configured by the configuration tool 330 to communicate information other than primary process variables to the asset management application 332 via links 334 and 336, rather than to the process controller 302.

Figure 3B:
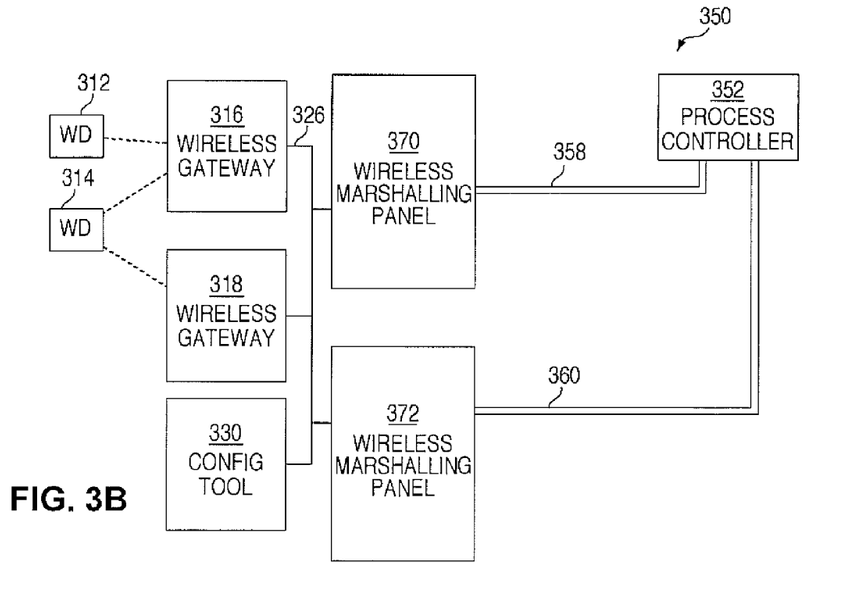
FIG. 3B illustrates another example system for distributed process control according to one embodiment of this disclosure.

FIG. 3B illustrates another example system for distributed process control according to one embodiment of this disclosure. A system 350 has a process controller 352 adapted to communicate with field devices using a digital signaling field device communication protocol via wire pairs 358 and 360. For illustrative purposes, the system 350 is described as using a FF H1 field device communication protocol. In the system 350, WMPs 370 and 372 may be used to enable the process controller 352 to communicate with wireless field devices 312 and 314.

As described with reference to FIG. 3A, the wireless devices 312 and 314 may communicate with the WMPs 370 and 372 via wireless gateways 316 and 318 and network 326. Similarly, a configuration tool 330 may be used to configure the WMPs 370 and 372 to generate and receive field device protocol messages corresponding to device descriptors used to configure the process controller 352.

In the system 350, primary process variable information transmitted by the wireless field device 312 and received by the WMP 370 may be converted into a FF H1 primary process variable message and transmitted to the process controller 352 on the communication link 358. Similarly, the WMP 370 may receive a FF H1 primary process variable message from the process controller 352 on the communication link 358 and transmit a corresponding message to the wireless field device 314 via either the wireless gateway 316 or the wireless gateway 318.

The wireless field device 312 may also transmit secondary or tertiary process variables to the WMP 370 via the wireless gateway 316. The WMP 370 may, in response, generate a corresponding message and transmit the message to the process controller 352 as a FF H1 message. Likewise, the process controller 352 may transmit a FF H1 message to the wireless field device 314 that is received by the WMP 370. The WMP 370 may then generate a corresponding message and transmit that message to the wireless field device 314 via either of the wireless gateways 316-318.

Although FIGS. 3A and 3B illustrate example systems 300 and 350 for distributed process control, various changes may be made to FIG. 3A or 3B. For example, the systems 300 or 350 could include any number of process controllers, terminal blocks, wireless marshalling panels, wireless gateways, and field devices.

Figure 4:
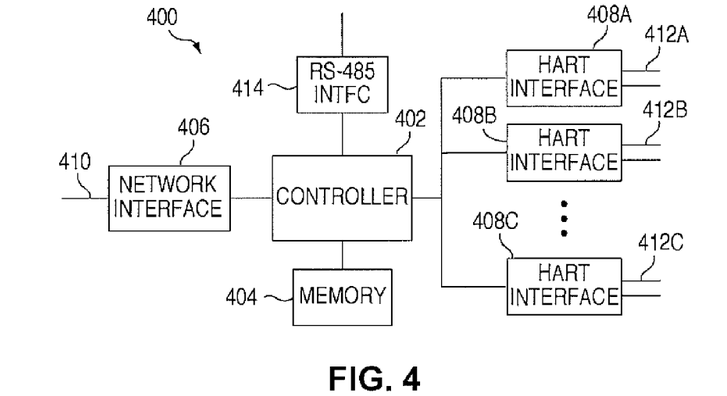
FIG. 4 illustrates an example wireless marshalling panel according to one embodiment of this disclosure.

FIG. 4 illustrates an example wireless marshalling panel 400 according to one embodiment of this disclosure. The panel 400 may include a controller 402 coupled to a memory 404. The memory 404 may store instructions for execution by the controller 402 and data used during execution of the instructions. The controller 402 may communicate with, for example, other devices on the network 326 of FIG. 3 via a network interface 406 and a network connection 410. The panel 400 may also communicate with, for example, the process controller 302 of FIG. 3 via one or more HART interfaces 408A-408C and wire pairs 412A-412C. The controller 402 may communicate with, for example, the asset management application 332 of FIG. 3A via RS-485 interface 414.

Each of these components includes any suitable hardware, software, firmware, or combination thereof for performing the desired functions. For example, the controller 402 could represent a digital signal processor, and the memory 404 could represent one or more volatile and/or non-volatile storage and retrieval devices. It will be understood that the controller 402 does not represent a process controller such as, for example, the process controller 352 of FIG. 3B. The network interface 406 could represent an Ethernet network interface or other network interface. The HART interfaces 408A-408C could represent circuitry for communicating over wire pairs 412A-412C.

Although FIG. 4 illustrates one example of a wireless marshalling panel 400, various changes may be made to FIG. 4. For example, the wireless marshalling panel 400 could include any number of controllers, memories, network interfaces, and HART interfaces. Also, the HART interfaces 408A-408C could be replaced by interfaces supporting any other suitable field device protocols.

Figure 5A:
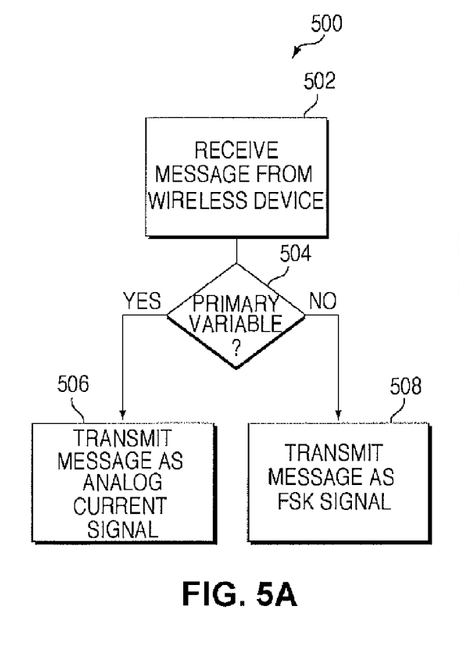
FIGS. 5A and 5B illustrate example methods for communicating between a wireless device and a process controller according to one embodiment of this disclosure.
Figure 5B:
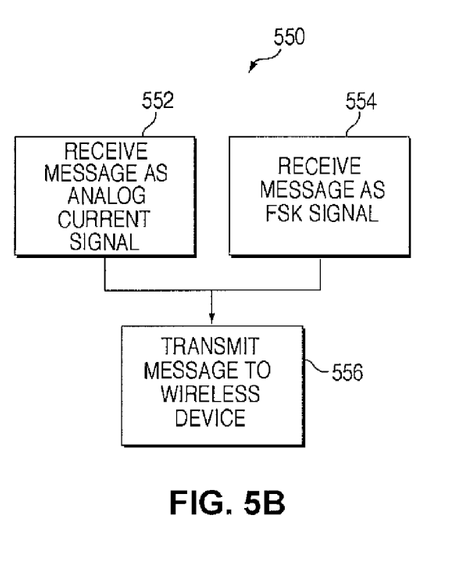

FIGS. 5A and 5B illustrate example methods 500 and 550, respectively, for communicating between a wireless device and a process controller according to one embodiment of this disclosure. As shown in FIG. 5A, in step 502 of the method 500, a wireless marshalling panel (such as the panel 400 of FIG. 4) receives a message via the network interface 406 from a wireless field device (such as the device 312 of FIG. 3A).

The controller 402 examines the message in step 504 to determine whether the message contains a report of a current value of a primary process variable measured by the wireless device 312. If so, then in step 506, according to stored configuration information, the controller 402 generates an analog current proportional to the value and transmits the analog current signal via, for example, the HART interface 408A. If the controller 402 determines in the step 504 that the message does not contain a primary process variable value, then in step 508, again according to stored configuration information, the controller 402 generates a message corresponding to the received message and transmits the generated message either via the RS-485 interface 414 or as a FSK signal via the HART interface 408A.

If the controller 402 receives a message from a different wireless field device in the step 502 (such as the device 314 of FIG. 3), the controller 402 may transmit corresponding messages via a different HART interface in steps 506 and 508. For example, the controller 402 may transmit HART protocol messages corresponding to messages received from the device 314 via the HART interface 408B.

As shown in FIG. 5B, in step 552 of the method 550, the controller 402 receives a message in the form of an analog current signal from the process controller 302 via the HART interface 408B. The controller 402 generates a corresponding message and transmits the corresponding message to the wireless field device 314 via the network interface 406 in step 556. The controller 402 also, in addition to step 552, receives a message in step 554 from the process controller 302 via the RS-485 interface 414 or via the HART interface 408B in the form of a FSK signal. The controller 402 then generates a corresponding message and transmits the corresponding message to the device 314 via the network interface 406 in the step 556. If the controller 402 receives messages via the HART interface 408A, it may instead transmit corresponding messages to the wireless device 312.

In some embodiments, on each wire pair 412A-412C, analog current signals are typically only sent to or received from a process controller, not both. The type of wireless field device being used may determine this directionality. Where the wireless field device produces a process variable (such as a sensor), the process controller may receive an analog current signal from the device. Where the wireless field device is a process variable consumer (such as an actuator), the process controller may send an analog current signal to the device. In contrast, the process controller may send or receive FSK signals to/from either type of wireless field device.

As used herein, the term "wireless" communication indicates the transmission of data via an ambient medium, for example, air. A non-wireless communication includes a communication achieved by transmission of data via a physical conduit, channel, or other communication path. Examples of such physical communication paths for non-wireless communication include copper or other conductive wires, optical fibers, coaxial and other cables, and any of a plethora of other known (or to be developed) communication or transmission lines. No specific structure is implied by either term (wireless or non-wireless), nor is the use of a particular band of frequencies, wavelengths, bit rates, or modulation protocols implied.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same (such as a processor, ASIC, FPGA, or other device that operates using software or firmware instructions). The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
a network interface configured to receive first messages from a first wireless device;
a controller configured to generate second messages corresponding to the first messages, the controller configured to generate the second messages based on a device descriptor associated with the first wireless device and with a process controller; and
a first field device protocol interface configured to transmit at least some of the second messages to the process controller over a wired communication link;
wherein, for each first message that contains primary process variable data, the controller is configured to generate the corresponding second message and to provide that second message to the first field device protocol interface for transmission to the process controller in a first format defined by a field device protocol;
wherein, for each first message that contains other process variable data that is not primary process variable data, the controller is configured to generate the corresponding second and to selectively provide that second message to (i) the first field device protocol interface for transmission to the process controller in a second format or (ii) an additional interface for transmission to the other destination, depending on a configuration of the apparatus, wherein the first field device protocol interface is configured to couple the wired communication link to the controller;
wherein the controller is further configured to receive a configuration message via the wired communication link, the configuration message comprising configuration information; and
wherein the controller is configured to generate the second messages corresponding to the first messages according to the configuration information.

2. The apparatus of claim 1, wherein:
the first format comprises an analog current signal; and
the second format comprises a frequency shift keying signal superimposed over the analog current signal.

3. The apparatus of claim 1, wherein:
the first field device protocol interface is further configured to receive third messages, the third messages comprising one or more messages received in the first format and one or more messages received in the second format;
the controller is further configured to generate fourth messages corresponding to the third messages; and
the network interface is further configured to transmit the fourth messages to the first wireless device.

4. The apparatus of claim 1, further comprising a second field device protocol interface configured to receive third messages, the third messages comprising one or more messages received in the first format and one or more messages received in the second format, wherein:
the controller is further configured to generate fourth messages corresponding to the third messages; and
the network interface is further configured to transmit the fourth messages to a second wireless device.

5. The apparatus of claim 4, wherein:
the network interface is further configured to receive fifth messages from the second wireless device;
the controller is further configured to generate sixth messages corresponding to the fifth messages; and
the second field device protocol interface is further configured to transmit at least some of the sixth messages.

6. The apparatus of claim 1, wherein the first field device protocol interface comprises at least one of: a HART interface, a Foundation Fieldbus H1 interface, a Foundation Fieldbus High Speed Ethernet interface, a Modbus interface, a Profibus interface, and a WorldFIP interface.

7. The apparatus of claim 1, further comprising a plurality of field device protocol interfaces, wherein:
the network interface is configured to receive a plurality of first messages from each of a corresponding plurality of wireless devices;
the controller is configured to generate a plurality of second messages corresponding to each plurality of first messages and to provide at least some of the second messages to one or more of the plurality of field device protocol interfaces; and
each of the plurality of field device protocol interfaces is configured to transmit the provided second messages.

8. The apparatus of claim 1, wherein:

the additional interface comprises a serial interface;

the controller is configured to provide all of the second messages to the first field device protocol interface in a first configuration; and the controller is configured to provide all of the second messages to the serial interface in a second configuration.

9. A system, comprising:

a first wireless device;

a process controller; and a wireless marshalling panel configured to:

receive first messages from the first wireless device;

generate second messages corresponding to the first messages, the wireless marshalling panel configured to generate the second messages based on a device descriptor associated with the first wireless device and with the process controller;

for each first message that contains primary process variable data, transmit the corresponding second message to the process controller via a first field device protocol interface coupled to a wired communication link in a first format defined by a field device protocol; and for each first message that contains other process variable data that is not primary process variable data, selectively transit the corresponding second message to (i) the process controller via the first field device protocol interface in a second format or (ii) another destination via an additional interface, depending on a configuration of the wireless marshalling panel, wherein the first field device protocol interface is configured to be coupled to the process controller by the wired communication link;

receive a configuration message via the wired communication link, the configuration message comprising configuration information; and generate the second message corresponding to the first message according to the configuration information.

10. The system of claim 9, further comprising a wireless gateway, wherein the first messages are received by the wireless marshalling panel from the first wireless device via the wireless gateway.

11. The system of claim 9, wherein:

the first format comprises an analog current signal; and the second format comprises a frequency shift keying signal superimposed over the analog current signal.

12. The system of claim 9, wherein the wireless marshalling panel is further configured to receive third messages from the process controller via the first field device protocol interface and to transmit corresponding fourth messages to the first wireless device, the third messages comprising one or more messages received in the first format and one or more messages received in the second format.

13. The system of claim 9, further comprising a second wireless device, wherein:

the wireless marshalling panel is further configured to receive third messages from the process controller via a second field device protocol interface and to transmit corresponding fourth messages to the second wireless device, the third messages comprising one or more messages received in the first format and one or more messages received in the second format.

14. The system of claim 13, wherein the wireless marshalling panel is further configured to receive fifth messages from the second wireless device and to transmit corresponding sixth messages to the process controller via the second field device protocol interface.

15. The system of claim 9, wherein the first field device protocol interface comprises at least one of: a HART communication link, a Foundation Fieldbus H1 communication link, a Foundation Fieldbus High Speed Ethernet communication link, a Modbus communication link, a Profibus communication link, and a WorldFIP communication link.

16. The system of claim 9, wherein:

the system comprises a plurality of wireless devices; and the wireless marshalling panel is configured to receive a plurality of first messages from each of the plurality of wireless devices and to transmit at least some corresponding second messages via one or more of a plurality of field device protocol interfaces.

17. A method, comprising:

receiving a first message from a first wireless device at an apparatus;

determining whether the first message comprises primary process variable data or other process variable data associated with a distributed process control system;

generating a second message corresponding to the first message, the second message generated based on a device descriptor associated with the first wireless device and with a process controller;

if the first message contains primary process variable data, transmitting the second message to the process controller via a first wired field device protocol communication link in a first format defined by a field device protocol; and if the first message contains other process variable data that is not primary process variable data, selectively transmitting the second message to (i) the process controller via the first wired field device protocol communication link in a second format or (ii) another destination, depending on a configuration of the apparatus;

wherein a configuration message is received at the apparatus via the first wired field device protocol communication link, the configuration message comprising configuration information;

wherein the second message corresponding to the first messages are generated according to the configuration information; and wherein the apparatus is coupled to the process controller through the first wired field device protocol communication link.

18. The method of claim 17, wherein:

the first format comprises an analog current signal; and the second format comprises a frequency shift keying signal superimposed over the analog current signal.

19. The method of claim 17, further comprising:

receiving a third message from the process controller via the first wired field device protocol communication link, the third message having the first format or the second format; and transmitting a corresponding fourth message to the first wireless device.

20. The method of claim 17, further comprising:

receiving a third message from the process controller via a second wired field device protocol communication link, the third message having the first format or the second format; and transmitting a corresponding fourth message to a second wireless device.

21. The method of claim 20, further comprising:
receiving a fifth message from the second wireless device; and
transmitting a corresponding sixth message to the process controller via the second wired field device interface.

22. The method of claim 17, wherein the first wired field device protocol communication link comprises at least one of: a HART communication link, a Foundation Fieldbus H1 communication link, a Foundation Fieldbus High Speed Ethernet communication link, a Modbus communication link, a Profibus communication link, and a WorldFIP communication link.

23. The method of claim 17, wherein:
receiving the first message comprises receiving a plurality of first messages from a corresponding plurality of wireless devices; and
transmitting the second message comprises transmitting at least some of a plurality of second messages corresponding to the plurality of first messages to the process controller via one or more of a plurality of wired field device protocol communication links.

* * * * *